Patented July 30, 1935

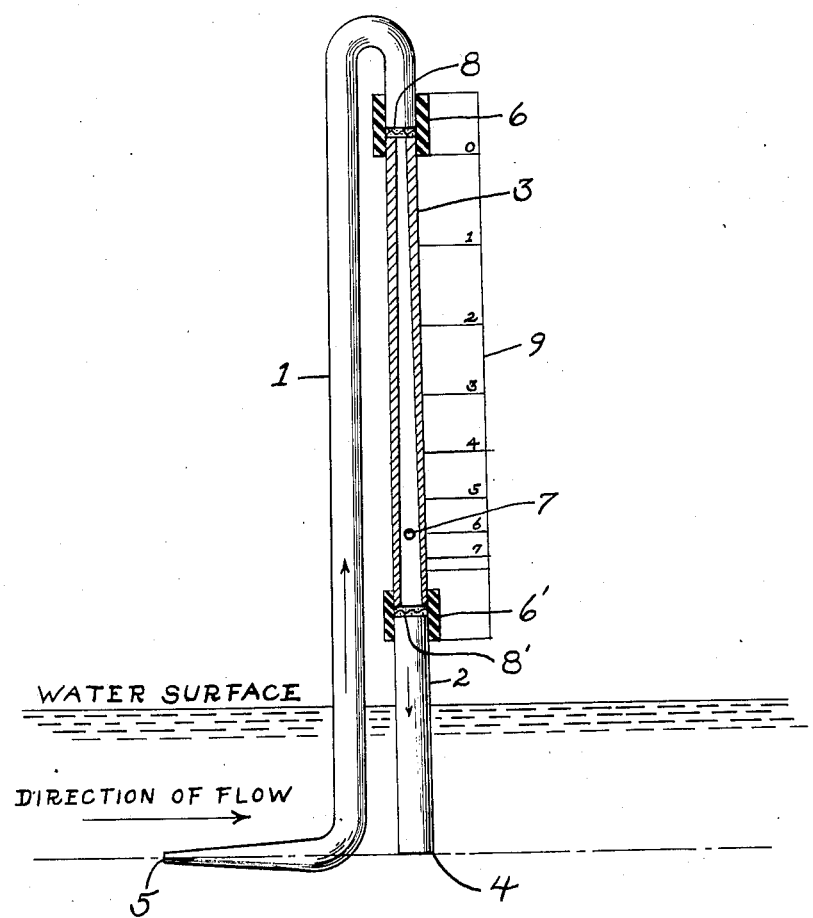

2,009,427

UNITED STATES PATENT OFFICE 2,009,427

VELOCITY TUBE

Carl Elvir Bentzel, Vicksburg, Miss.

Application December 18, 1933, Serial No. 703,004

2 Claims. (Cl. 73—167)

(Granted under the act of March 3, 1883, as amended April 30, 1928; 370 O. G. 757)

This invention described herein may be manufactured and used by or for the Government for governmental purposes, without the payment to me of any royalty thereon.

The invention is an instrument for measuring velocities of flowing liquid at any point in the liquid. It can also be used to measure the rate of flow through a pipe line. The instrument is especially well adapted for hydraulic research in connection with model experiments of rivers. It is very sensitive and will register very small velocities.

One form of the invention is illustrated in the accompanying drawing, which shows a vertical section of the instrument.

The instrument consists mainly of a U-shaped tube. The end of leg 1 of the tube is bent to an angle of 90° and tapered. The taper decreases as it approaches the end, which is indicated in the drawing by the numeral 5, and which is provided with an intake opening opposed to the direction of flow. The other leg 2 is provided with a tube 3, made of glass or any other transparent material, the inside diameter of which increases toward its lower end. The ends 4 and 5 of both legs are open. The tube 3 is held in place by the couplings 6 and 6'. In the tube 3 is an indicator 7 which is slightly lighter than the fluid, the velocity of which is to be determined. At each end of the tube 3 is a wire screen 8 and 8' attached with openings small enough to prevent the indicator 7 from leaving the tube 3.

The operation of the instrument is as follows: The tube is filled with water, or any other fluid, the velocity of which is to be determined, by submerging until all air has escaped. After this operation the tube is raised to a vertical position taking care not to raise the ends 4 and 5 over the fluid surface. The instrument is now ready for operation and the position of the indicator 7 on the scale 9 indicates the velocity of the flowing liquid at the opening 5. By moving the instrument the velocity at any point can easily be read on the scale. Care should be taken to keep the tapered end of leg 1 parallel to and pointing against the direction of flow.

The principle of the instrument is as follows:

Due to the position of the instrument in the flowing water the entrance area 5 being perpendicular to the direction of flow a velocity head is created in leg 1. This velocity head is zero in leg 2 because the outlet area 4 is parallel to the direction of flow. The unbalanced velocity head in leg 1 causes a flow of fluid through the tube as indicated by arrows. The greater the velocity of the fluid the greater the velocity head will be and the faster the movement of fluid through the tube. The rate of fluid movement through the U-tube is measured in the tube 3. If there is no movement of fluid the indicator 7 will rise in the tube 3 until stopped by the upper screen 8. For a certain flow of fluid through the instrument the impact forces of the flowing fluid on the indicator will exceed its buoyancy and the float will start to move down. Since the tube 3 has an increasing area the impact forces of the fluid on the indicator will decrease as the indicator moves down. The indicator will stop when such a cross-sectional area of the tube 3 is reached that the impact forces of the fluid on the indicator 7 balance its buoyancy. If the flow through the U-tube is increased still more the indicator 7 will move still further down until equilibrium again is reached. Thusly each position of the indicator 7 on the scale corresponds to a certain flow through the tube, which flow in its turn is a function of the velocity of the fluid at the entrance 5. As the flow through the U-tube is measured the flow in any pipe line can be measured in the tapered tube 3.

I am aware that prior to my invention a Pitot tube has been in use which is based on measuring the velocities of flowing water by observing the velocity head directly; but

I claim:

1. A flow meter comprising an upright U-shaped tube, one leg having an end bent so as to be subject to a dynamic pressure due to flow, the other leg having an end being subject to a static pressure, said other leg having a tapered transparent portion, the largest diameter of the tapered transparent portion being at the bottom thereof, a float in said tapered portion, abutments at the ends of said tapered portion permitting unrestrained flow of fluid but preventing the passage of said float, and a scale for cooperation with said float positioned adjacent to said tapered portion.

2. A flow meter comprising an upright U-shaped tube, one leg having an end bent at an angle of 90° so as to be subject to a dynamic pressure due to flow, the other leg having an end being subject to a static pressure, said other leg having a tapered transparent portion, the largest diameter of the transparent tapered portion being at the bottom thereof, a float in said tapered portion, a screen at each end of said tapered portion permitting unrestrained flow of fluid but preventing the passage of said float, and a scale for cooperation with said float positioned adjacent said tapered portion.

CARL ELVIR BENTZEL.